(12) United States Patent
Johnson et al.

(10) Patent No.: US 11,314,103 B2
(45) Date of Patent: Apr. 26, 2022

(54) AUTOSTEREOSCOPIC DISPLAY DEVICE

(71) Applicant: KONINKLIJKE PHILIPS N.V., Eindhoven (NL)

(72) Inventors: Mark Thomas Johnson, Eindhoven (NL); Bart Kroon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 19 days.

(21) Appl. No.: 16/898,825

(22) Filed: Jun. 11, 2020

(65) Prior Publication Data
US 2020/0301163 A1 Sep. 24, 2020

Related U.S. Application Data

(63) Continuation of application No. 15/646,267, filed on Jul. 11, 2017, now Pat. No. 10,712,584, which is a continuation of application No. 14/442,829, filed as application No. PCT/IB2013/058273 on Sep. 4, 2013, now Pat. No. 9,733,483.

(60) Provisional application No. 61/727,311, filed on Nov. 16, 2012.

(51) Int. Cl.
*G02B 30/27* (2020.01)
*G02B 30/35* (2020.01)

(52) U.S. Cl.
CPC ............. *G02B 30/27* (2020.01); *G02B 30/35* (2020.01)

(58) Field of Classification Search
CPC ........ G02B 30/27; G02B 30/35; G02B 30/26; G02B 30/33
USPC .......................................................... 359/463
See application file for complete search history.

(56) References Cited

U.S. PATENT DOCUMENTS

| | | | |
|---|---|---|---|
| 5,483,254 A | 1/1996 | Powell | |
| 9,733,483 B2 | 8/2017 | Johnson | |
| 2002/0122144 A1 | 9/2002 | Yoshida | |
| 2005/0007517 A1 | 1/2005 | Anandan | |
| 2006/0050385 A1 | 3/2006 | Uehara | |
| 2007/0096125 A1 | 5/2007 | Vogel | |
| 2007/0263088 A1 | 11/2007 | Park | |
| 2008/0285282 A1 | 11/2008 | Karman | |
| 2010/0039698 A1 | 2/2010 | Robinson | |
| 2012/0062991 A1 | 3/2012 | Krijn | |
| 2014/0111855 A1* | 4/2014 | Johnson | G02B 30/27 359/463 |

FOREIGN PATENT DOCUMENTS

KR 20120012893 A 2/2012

OTHER PUBLICATIONS

Youn KR20120012893 english translation obtained on google patents Aug. 24, 2021 (Year: 2012).*

(Continued)

*Primary Examiner* — Kristina M Deherrera

(57) ABSTRACT

An autostereoscopic display device uses an electroluminescent display. A set of pixels is provided beneath view forming elements (such as lenses), with a plurality of pixels across the view forming element width direction. The pixels are arranged with at least two different angular orientations with respect to the substrate. The out-coupling performance is improved by arranging for the light emission direction to be substantially perpendicular to the desired emitting surface of the view forming elements.

24 Claims, 5 Drawing Sheets

(56) References Cited

OTHER PUBLICATIONS

Rahadian, R. et al "Integration of Multiple Organic Lighting Diodes and a Lens for Emisison Angle Control" IEICE Transactions on Electronics, vol. E91C, No. 10, 2008 p. 1536-1541.
Mehta et al "Light out Coupling Strategies in Organic Light Emittion Devices"Proc. of ASID, Oct. 2006, p. 198-201.
Antoniadis "An Overview of OLED Display Technology" Osram Opto Semiconductors Inc. 2003.

* cited by examiner

AUTOSTEREOSCOPIC DISPLAY DEVICE

CROSS-REFERENCE TO PRIOR APPLICATIONS

This application a continuation of U.S. patent application Ser. No. 15/646,267 filed on Jul. 11, 2017 which is a continuation of U.S. patent application Ser. No. 14/442,829, filed on May 14, 2015, which is U.S. National Phase application under 35 U.S.C. § 371 of International Application No. PCT/IB2013/058273, filed on Sep. 4, 2013, which claims the benefit of U.S. Patent Application No. 61/727,311, filed on Nov. 16, 2012. These applications are hereby incorporated by reference herein.

FIELD OF THE INVENTION

This invention relates to an autostereoscopic display device of the type that comprises a display panel having an array of display pixels for producing a display and an imaging arrangement for directing different views to different spatial positions.

BACKGROUND OF THE INVENTION

A first example of an imaging arrangement for use in this type of display is a barrier, for example with slits that are sized and positioned in relation to the underlying pixels of the display. In a two-view design, the viewer is able to perceive a 3D image if his/her head is at a fixed position. The barrier is positioned in front of the display panel and is designed so that light from the odd and even pixel columns is directed towards the left and right eye of the viewer, respectively.

A drawback of this type of two-view display design is that the viewer has to be at a fixed position, and can only move approximately 3 cm to the left or right. In a more preferred embodiment there are not two sub-pixel columns beneath each slit, but several. In this way, the viewer is allowed to move to the left and right and perceive a stereo image in his/her eyes all the time.

The barrier arrangement is simple to produce but is not light efficient. A preferred alternative is therefore to use a lens arrangement as the imaging arrangement. For example, an array of elongate lenticular elements can be provided extending parallel to one another and overlying the display pixel array, and the display pixels are observed through these lenticular elements.

The lenticular elements are provided as a sheet of elements, each of which comprises an elongate semi-cylindrical lens element. The lenticular elements extend in the column direction of the display panel, with each lenticular element overlying a respective group of two or more adjacent columns of display pixels.

In an arrangement in which each lenticule is associated with two columns of display pixels, the display pixels in each column provide a vertical slice of a respective two dimensional sub-image. The lenticular sheet directs these two slices and corresponding slices from the display pixel columns associated with the other lenticules, to the left and right eyes of a user positioned in front of the sheet, so that the user observes a single stereoscopic image. The sheet of lenticular elements thus provides a light output directing function.

In other arrangements, each lenticule is associated with a group of four or more adjacent display pixels in the row direction. Corresponding columns of display pixels in each group are arranged appropriately to provide a vertical slice from a respective two dimensional sub-image. As a user's head is moved from left to right, a series of successive, different, stereoscopic views are perceived creating, for example, a look-around impression.

Known autostereoscopic displays use liquid crystal displays to generate the image.

There is increasing interest in the use of organic light emitting diode (OLED) displays generally, as these do not need polarizers, and potentially they should be able to offer increased efficiency since the pixels are turned off when not used to display an image, compared to LCD panels which use a continuously illuminated backlight. However, these display pixels emit light in a wide range of directions, and in 3D displays this presents a particular problem of cross talk.

This invention is based on the use of an OLED or other thin film emissive display such as an electroluminescent display within an autostereoscopic display system, and makes use of the additional design flexibility offered by these displays, in order to address the problem of cross talk between views in a 3D lenticular display.

SUMMARY OF THE INVENTION

The invention is defined by the independent claims. Further features are defined in the dependent claims.

According to the invention, there is provided an autostereoscopic display device comprising:

an electroluminescent display arrangement comprising an array of spaced pixels over a substrate each having a light output surface;

an autostereoscopic view forming arrangement comprising a set of view forming elements over the display arrangement, wherein a set of pixels is provided beneath each view forming element with at least two pixels across the view forming element width direction, wherein the pixels across the view forming element width direction are arranged with at least two different angular orientations of their light output surface with respect to the substrate.

The OLED emitters are thus parallel to a tilted surface, such that the OLED emits light centred around a direction which is not perpendicular to the display, the emission direction being different for different OLED pixels. In this manner, the out-coupling performance is improved by arranging for the light emission direction to be substantially perpendicular to the desired emitting surface of the view forming arrangement (such as a microlens or lenticular lens array). The approach also results in a reduction of crosstalk between different views, as these become more separated in angle by the tilting.

The angle of tilt is preferably in a plane perpendicular to the display substrate plane and parallel to the view forming element width direction (i.e. in a vertical slice through the display across the width direction).

In the case of elongate lenticular lenses, the lens elongate axis direction remains parallel to the plane of the light output surface, so that the angle of tilt can be considered as a tilt about the elongate lens axis. The light output surfaces are thus tilted in a way which generally corresponds to (or mirrors) the shape of the lens surface.

The lenticular lenses preferably extend in a pixel column direction or are inclined at an acute angle to the pixel column direction, wherein each lens covers a plurality of pixel columns.

The electroluminescent display arrangement can comprise an array of reflective anodes over the substrate, an array of electroluminescent layer portions over the anodes, and an array of transparent cathodes over the electroluminescent layer portions. This defines a top emitting structure. In this case, the electroluminescent portions are between the substrate and the lens arrangement.

Instead, the electroluminescent display arrangement can comprise an array of transparent anodes over the substrate, an array of electroluminescent layer portions over the anodes, and an array of reflective cathodes over the electroluminescent layer portions. This defines a bottom emitting structure. In this case, the substrate is between the electroluminescent portions and the lens arrangement.

In further embodiments both the anode and the cathode may be at least partially transparent, resulting in a transparent electroluminescent emitting structure.

The substrate can be planar and the device can then comprise spacers between at least some of the pixels and the substrate to define the different angular orientations. Different pixel heights can also be provided by the spacers with respect to the substrate, so that all pixels lie at the focal surface of the lenses.

Alternatively, the substrate can have a non-planar shape thereby to define the different orientations, and again optionally with desired different heights.

The invention also provides a method of displaying autostereoscopic images, comprising:

generating a pixelated image using an electroluminescent display arrangement comprising an array of spaced pixels over a substrate; and directing different sub-images to different directions using a view forming arrangement comprising a set of view forming elements over the display arrangement, wherein a set of pixels is provided beneath each view forming element each having a light output surface, with at least two pixels across the view forming element width direction, wherein the method further comprises positioning the pixels across the view forming element width direction with at least two different angular orientations of their light output surface with respect to the substrate.

The invention also provides a method manufacturing an autostereoscopic display device, comprising:

forming an electroluminescent display arrangement comprising an array of spaced pixels over a substrate;

providing a view forming arrangement comprising a plurality of view forming elements over the display arrangement, wherein a set of pixels is provided beneath each view forming element each having a light output surface, with at least two pixels across the view forming element width direction, wherein the method comprises arranging the pixels across the view forming element width direction with at least two different angular orientations of their light output surface with respect to the substrate.

The different angular orientations are provided by:

providing spacers between at least some of the pixels and a planar substrate; or forming the electroluminescent display arrangement over a contoured substrate; or forming the electroluminescent display arrangement over a planar substrate and subsequently forming a contour.

BRIEF DESCRIPTION OF THE DRAWINGS

An embodiment of the invention will now be described, purely by way of example, with reference to the accompanying drawings, in which.

DETAILED DESCRIPTION OF THE EMBODIMENTS

The invention provides an autostereoscopic display device using an electroluminescent display, wherein a set of pixels is provided beneath a view forming arrangement, with a plurality of pixels across the view forming element width direction. The pixels across the width direction are arranged with at least two different angular orientations with respect to the substrate. This enables the pixels output surfaces to define a non-planar array, and they can follow the area to which light is focused by the lenticular lenses.

Before describing the invention, the basic operation of a known 3D autostereoscopic display will first be described.

Figure 1:
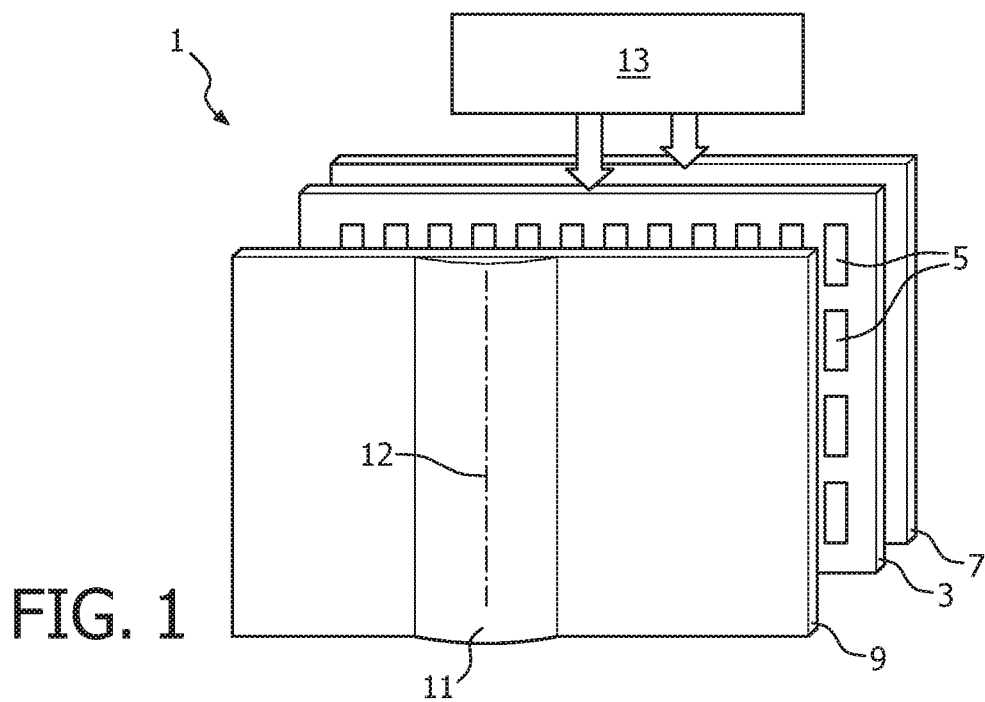
FIG. 1 is a schematic perspective view of a known autostereoscopic display device.

FIG. 1 is a schematic perspective view of a known direct view autostereoscopic display device 1 using an LCD panel to generate the images. The known device 1 comprises a liquid crystal display panel 3 of the active matrix type that acts as a spatial light modulator to produce the display.

The display panel 3 has an orthogonal array of display pixels 5 arranged in rows and columns. For the sake of clarity, only a small number of display pixels 5 are shown in the Figure. In practice, the display panel 3 might comprise about one thousand rows and several thousand columns of display pixels 5.

The structure of the liquid crystal display panel 3 as commonly used in autostereoscopic displays is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarising layers are also provided on the outer surfaces of the substrates.

Each display pixel 5 comprises opposing electrodes on the substrates, with the intervening liquid crystal material therebetween. The shape and layout of the display pixels 5 are determined by the shape and layout of the electrodes. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9, arranged over the display side of the display panel 3, which performs a view forming function. The lenticular sheet 9 comprises a row of lenticular elements 11 extending parallel to one another, of which only one is shown with exaggerated dimensions for the sake of clarity.

The lenticular elements 11 are in the form of convex cylindrical lenses, and they act as a light output directing means to provide different images, or views, from the display panel 3 to the eyes of a user positioned in front of the display device 1.

The device has a controller 13 which controls the backlight and the display panel.

The autostereoscopic display device 1 shown in FIG. 1 is capable of providing several different perspective views in different directions. In particular, each lenticular element 11 overlies a small group of display pixels 5 in each row. The lenticular element 11 projects each display pixel 5 of a group in a different direction, so as to form the several different views. As the user's head moves from left to right, his/her eyes will receive different ones of the several views, in turn.

In the case of an LCD panel, a light polarising means must also be used in conjunction with the above described array, since the liquid crystal material is birefringent, with the refractive index switching only applying to light of a particular polarisation. The light polarising means may be provided as part of the display panel or the imaging arrangement of the device.

Figure 2:
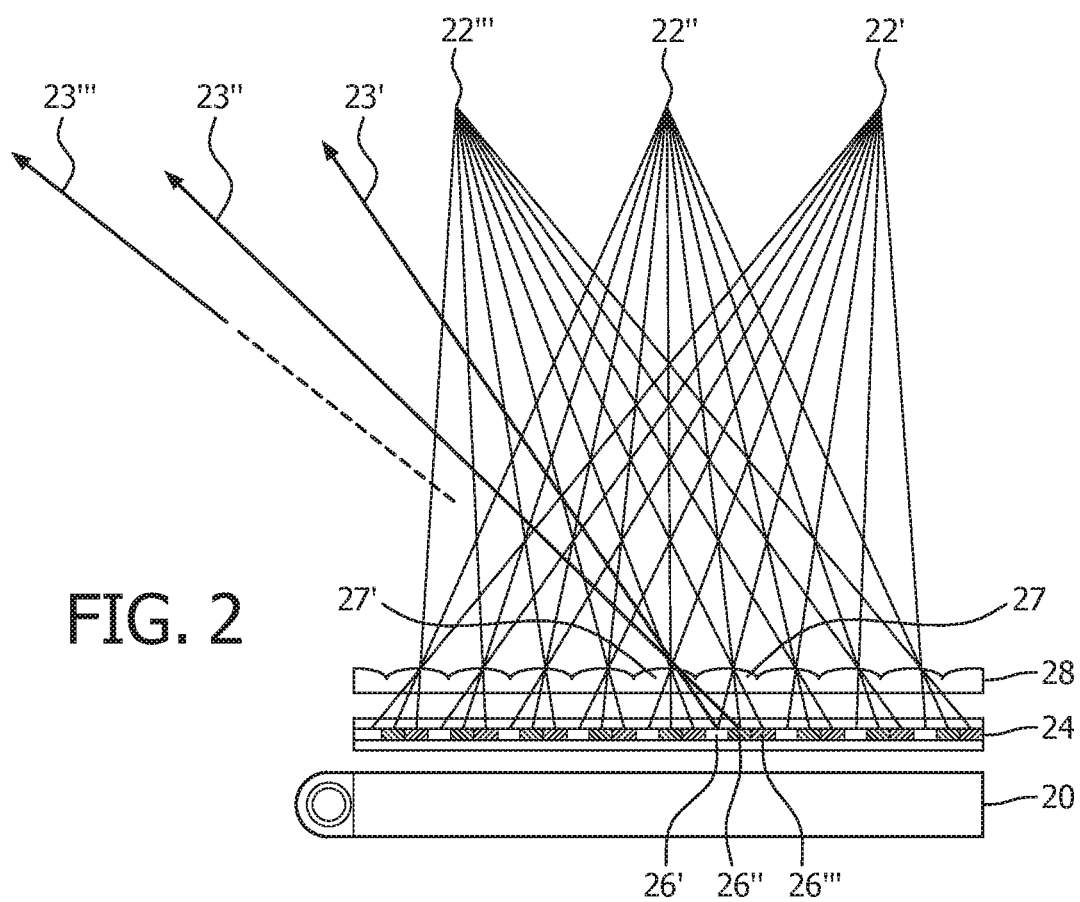
FIG. 2 shows how a lenticular array provides different views to different spatial locations.

FIG. 2 shows the principle of operation of a lenticular type imaging arrangement as described above and shows the backlight 20, display device 24 such as an LCD and the lenticular array 28. FIG. 2 shows how the lenticular arrangement 28 directs different pixel outputs to three different spatial locations 22', 22", 22"'. These locations are all in a so-called viewing cone, in which all views are different. The views are repeated in other viewing cones, which are generated by pixel light passing through adjacent lenses. The spatial locations 23', 23", 23"' are in the next viewing cone.

The invention is based on the use of an electroluminescent display technology, such as an OLED display, instead of the LCD display shown in FIGS. 1 and 2. The use of an OLED display avoids the need for a separate backlight and polarizers. OLED promises to be the display technology of the future.

OLED displays differ significantly from LCD displays in how the light is emitted from the pixel. OLED pixels are diffuse emitters that emit light in all directions. For 2D, this is a clear advantage over LCD displays that require a backlight and that, without taking special measures, emit light only in a narrow beam. The diffuse emission of the OLED material also poses a challenge as a lot of light is recycled inside the organic layers and is not emitted making for a low efficiency. For example, without taking any measures, the light extraction out of the OLED can be as low as 20%.

To improve this various solutions have been sought to improve the out-coupling of the light out of the OLED.

However, what is an improvement for 2D displays is a problem for making 3D autostereoscopic OLED displays. The solutions for increasing the light output cannot be used in autostereoscopic lenticular displays as the light emitted from one lenticular lens may be reflected in the glass to a neighbouring lens. This reduces contrast and increases crosstalk.

Figure 3:
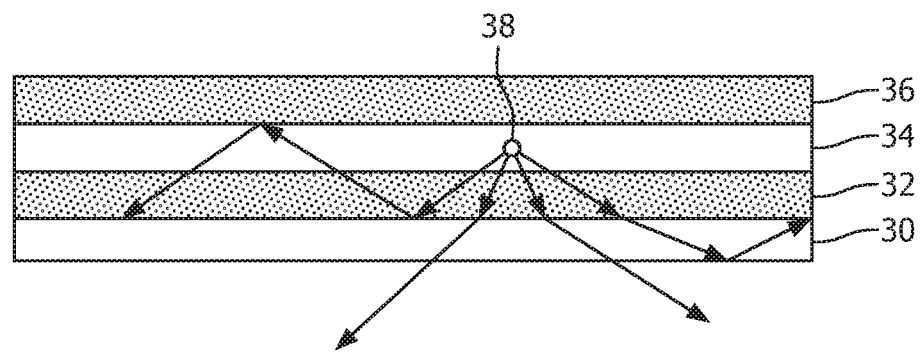
FIG. 3 schematically shows the structure of a single pixel of an OLED display, and in the form of a backward emitting structure.

FIG. 3 schematically shows the structure of a single pixel of an OLED display, and in the form of a backward emitting structure (i.e. through the substrate). Whilst OLED devices are typically bottom emitting as shown, and emit light through the glass substrate, another approach is to make the OLED stack top emitting such that the light emits through a transparent cathode (and a thin encapsulating layer) and not through the glass substrate.

In FIG. 3, the display comprises a glass substrate 30, a transparent anode 32, a light emissive layer 34 and a mirrored cathode 36.

The lines represent the path light can take when emitted from a point 38 in the organic layer. As the light is emitted from the source it can travel in all directions. When the light reaches the transition from one layer to another layer the difference between the refractive index of each of the layers determines whether the light can escape one layer and get into the next. The refractive index is determined by the speed of light in the material and is given by Snell's law:

$$\frac{\sin\theta_1}{\sin\theta_2} = \frac{v_1}{v_2} = \frac{n_2}{n_1}$$

v is the velocity and n is the refractive index.

Typically, the refractive index of the organic material is high n=1.8 while the refractive index of glass is 1.45.

When the angle of incidence of light that travels from a material with a high refractive index to a material with a low refractive index is large enough, the light cannot leave the material. This angle of incidence is the critical angle and is given by $\alpha=\arcsin(n2/n1)$. For the organic material into glass this gives: $\arcsin(1.45/1.8)=54$ degrees. This makes it evident that a lot of the light generated in the organic layer never leaves the layer but stays inside the material, where it is re-absorbed and drives another photon emission or turns into heat.

The same happens for the light that does leave the organic layer and gets into the glass. A lot of light cannot leave the glass at the glass to air interface.

Several solutions have been proposed both for improving the coupling of light out of the organic layers into the glass and out of the glass into air.

Whilst traditional OLED devices emit light through the glass substrate, another approach as mentioned above is to make the OLED stack such that the light emits through a transparent cathode and a thin encapsulating layer and not through the glass substrate. This is referred to as a top emitting OLED. In general, different approaches to increasing the light extraction work better (or only) with either top or bottom emitting OLED structures.

This invention is applicable to both the use of bottom- and top-emitting OLED displays.

Whilst known solutions help to improve the light extraction efficiency up to 80% for lighting applications and for 2D displays, they do not provide a good solution for an autostereoscopic 3D TV. A problem occurs when fitting a lenticular lens on the OLED display for creating an autostereoscopic TV. Here, even with a top emitting OLED, light will still be injected into a relatively thick glass layer causing the problems highlighted above. Some of the known methods improve the light extraction out of the organic material but a substantial amount of light will remain in waveguide mode in the glass, part of which will be absorbed.

This has the undesired side effect of reducing contrast and increasing crosstalk. This is more an issue for 3D displays because for 2D displays, in many cases adjacent pixels will display the same colour (i.e. white or coloured areas of a screen, lines of single colour etc.) whereby if any light escapes from a neighbouring pixel, this will simply add to the desired colour. However, in a 3D display, adjacent pixels do not in general have any relationship to each other, as they belong to different views and will generally be of different colour content. In this case, if any light escapes from a neighbouring pixel, this will seriously affect the quality of the image.

Figure 4:
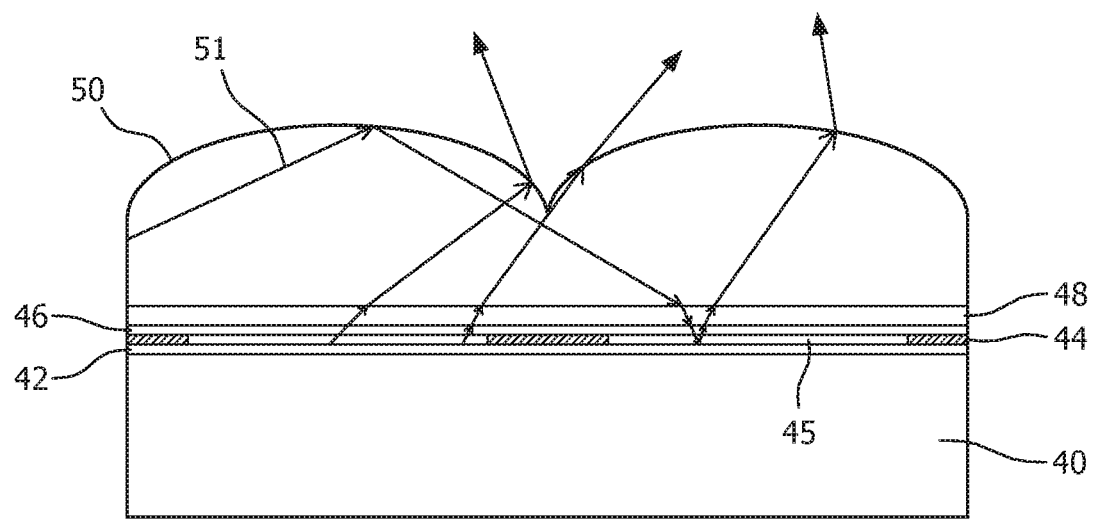
FIG. 4 is used to explain the problem of forming a lenticular over an electroluminescent display panel.

FIG. 4 shows what in practice happens when applying a lenticular lens to a top emitting structure.

The display comprises the glass substrate 40, a reflective anode 42, the OLED layer 44 and the top transparent cathode 46. Pixels 45 are defined with in the OLED layer by the pixel electrode design. A sealing and passivation layer 48 is between the display and the lenticular lens array 50. Even with out-coupling of all light from the display panel into the lenticular array, there is still waveguiding within the lenticular array itself, which cannot be prevented by the known measures to improve light out-coupling.

As illustrated in FIG. 4 some of the light will stay in waveguide mode in the lenticular array glass and enter the optical path of a neighbouring view (or pixel/subpixel). Here it may be reflected back and leave through the lens or it is re-absorbed in the pixel. If the light does leave the lens of the neighbouring view it will create some crosstalk.

The invention provides the OLED emitters on a tilted surface with respect to the general plane of the display, i.e. with respect to the display substrate. In this way, each OLED pixel emits light centred around a direction which is not perpendicular to the display, the emission direction being different for different pixels under a given lens, and thereby different for regions of the lens surface through which the pixel output is primarily directed. The out-coupling performance is improved by arranging for the light emission direction to be substantially perpendicular to the desired emitting surface of the (lenticular) lens array. The approach also results in a reduction of crosstalk between different views, as these become more separated in angle by the tilting.

Figure 5:
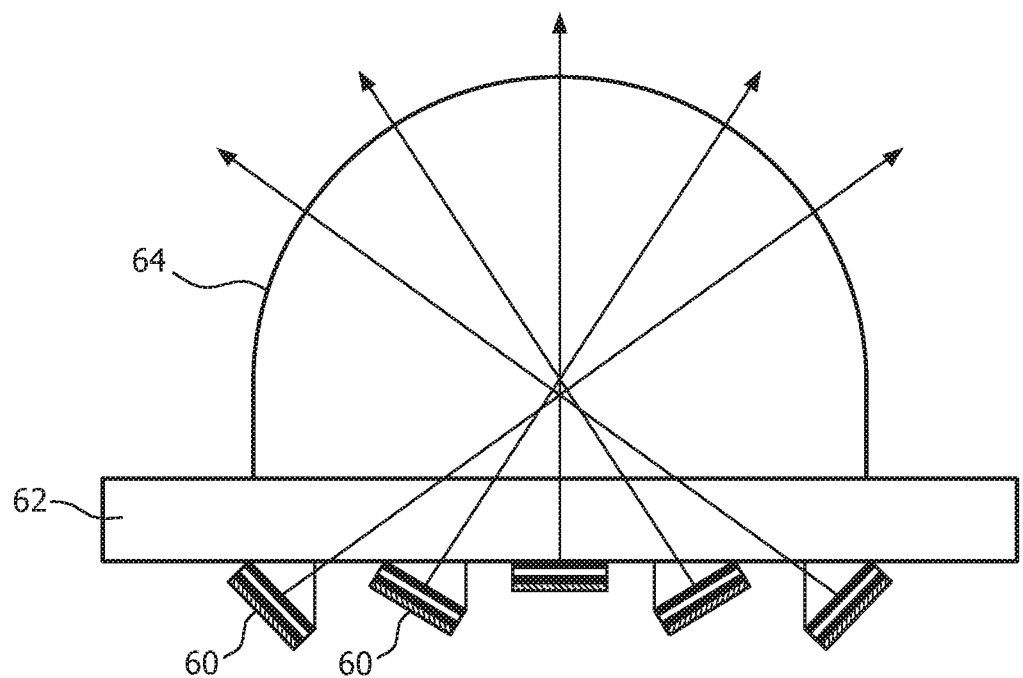
FIG. 5 shows a first example of pixel structure in accordance with the invention.

FIG. 5 shows a first embodiment of a bottom emitting 3D OLED display with emitters tilted relative to display surface In this first embodiment a bottom emitting OLED display structure is shown, and the OLED emitters associated with each lenticular lens having given different angles of tilt of their light output surface relative to the plane of the display surface.

The cross section of FIG. 5 (and the other figures) is vertical (i.e. perpendicular to the display plane) and along the lenticular lens width direction. The angle of tilt is in this plane. The lens elongate axis direction is into or out of the page and is within the plane of the light output surface.

The angle of tilt is in a plane perpendicular to the display substrate plane and parallel to the lens width direction (i.e. in a vertical slice through the display across the lens width direction). The lens elongate axis direction remains parallel to the plane of the light output surface, so that the angle of tilt can be considered as a tilt about the elongate lens axis. The light output surfaces are thus tilted in a way which generally corresponds to (or mirrors) the shape of the lens surface. In some cases, the tilt may also be in a plane perpendicular to the display substrate plane and at an angle to the lens width direction. This may be a practical solution if, for example, the lenticular is aligned at an angle to the column direction of the display. The tilt can then be in a plane perpendicular to the display substrate plane and perpendicular to the pixel column direction.

The OLED pixels are shown as 60. Their layer structure is conventional, for example as described above in connection with FIG. 3 or 4 and is not repeated. The OLED pixels are on the underside of the main display glass substrate 62, with the lenticular lens array 64 on the opposite side of the substrate 62 to the pixels 60.

FIG. 5 (and the other figures) are not drawn to scale: typically, the thickness of the OLED layers are submicron, whereas the vertical dimensions of the lenticular lens are 100's-1000's of microns, and the lateral dimension of the pixels is the order of 100's of microns. Thus in practise, the tilt angle of the OLEDs will be lower than suggested by the figures.

The angle of tilt depends for example on the angular width of the lens surface. With the curved lens surface facing outwards, a maximum angle needed is around 45 degrees. When the lens has a replica, the maximum angle that enters the lens is determined by the refractive index of the glass. For instance, when the glass has a common refractive index value of n equal to 1.5, then the critical angle at the glass-air interface is $\sin^{-1}(1/n)$, which equals 42 degrees. For an extreme value of n equals 1.7 it gives 36 degrees and for n equals 1.3 it gives 50 degrees.

The extreme rays close to this critical angle are not typically in the primary cone (see FIG. 2), so the maximum tilt angle can be less. For current products, the viewing cone angle is typically only 10 degrees so that the approach of the invention is less critical. With OLED technology providing increased resolution, cone angles will increase: making three times the views allows a cone of 30 degrees full-angle relative to that the current typical design. In this case, some pixel emitters should be titled by 15 degrees.

The light rays are emitted centred around the direction perpendicular to the OLED pixel output surface, but with a broad distribution. The width of the distribution depends upon the details of the OLED stack. The design is such that the centre of this distribution—where the intensities are highest—is perpendicular to the local exit surface. In the figures, only this central highest intensity output direction of the light distribution is represented.

The tilt angles are designed such that the OLED light exits the lenticular lens surface at an angle close to perpendicular to the local exit surface of the lens. Thus, the light output surface of each OLED pixel has a normal direction (the arrows shown in FIG. 5) which crosses the lens surface perpendicularly to the local tangential surface to the lens. The tilt angle increases away from the centre of the lenticular lens in a symmetrical manner. In this manner, the light intensity emitted from the display is maximised. Furthermore, the tilt angle also reduces the amount of light which is emitted from a pixel in the direction of its neighbour, whereby the amount of cross talk further reduces.

For manufacturing purposes, the tilt may be realised in several manners:
(i) using a planar OLED sheet which is later deformed, for instance by laminating a flexible or conformal OLED sheet (such as realised using a plastic (polyimide) or metal foil substrate) on a more rigid preformed substrate;
(ii) deposition of OLEDs on a pre-formed substrate. As the surface topography required is limited both evaporation techniques (as used for OLED deposition) and conventional surface processing techniques (such as spin coating) are possible;

(iii) Using a standard glass substrate and using a photo-resist (such as SU8) or a dielectric layer (such as $SiO_2$), or a combination thereof to form tilt structures.

Experience of forming such layers within display processing has been obtained from LCD's with so-called field shielded pixels, from transflective LCDs (where the cell has 2 different LC cell gaps) and for generating printing dams for polymer OLED displays.

Figure 6:
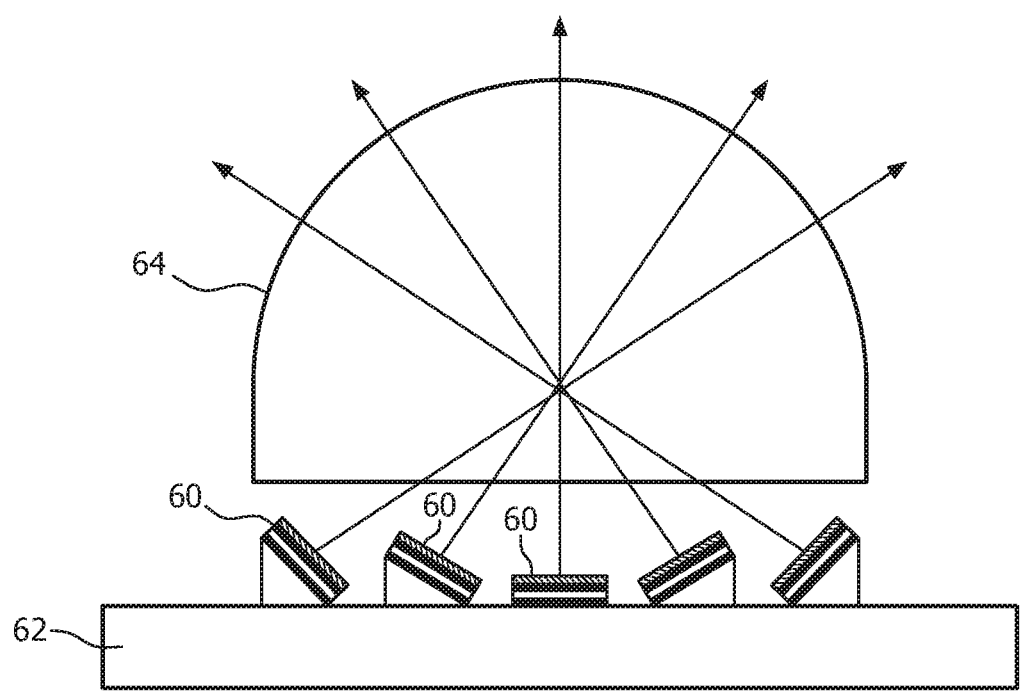
FIG. 6 shows a second example of pixel structure in accordance with the invention.

A second embodiment is shown in FIG. 6 using a top emitting OLED display structure with emitters tilted relative to the display surface.

The OLED pixels are again shown as 60. The OLED pixels 60 are on the upper side of the main display glass substrate 62, with the lenticular lens array 64 over the pixels 60. Again, the OLED emitters have different tilts relative to the plane of the display surface. In the same way as in the embodiment of FIG. 5, the light rays are emitted centred around the direction perpendicular to the OLED pixels, and exit the lenticular lens at an angle close to perpendicularly to the local exit surface.

One issue related to this embodiment is the in-coupling of light into the lenticular lens since it is desirable to avoid internal reflection at the lower boundary of the lenticular structure. This can be improved by the use of a collimated OLED emitter, by a local (tilted) in-coupling facet on the underside of the lenticular lens, or by using a medium of intermediate refractive index between the emitter and the lens.

The same manufacturing options are available as discussed above.

Figure 7:
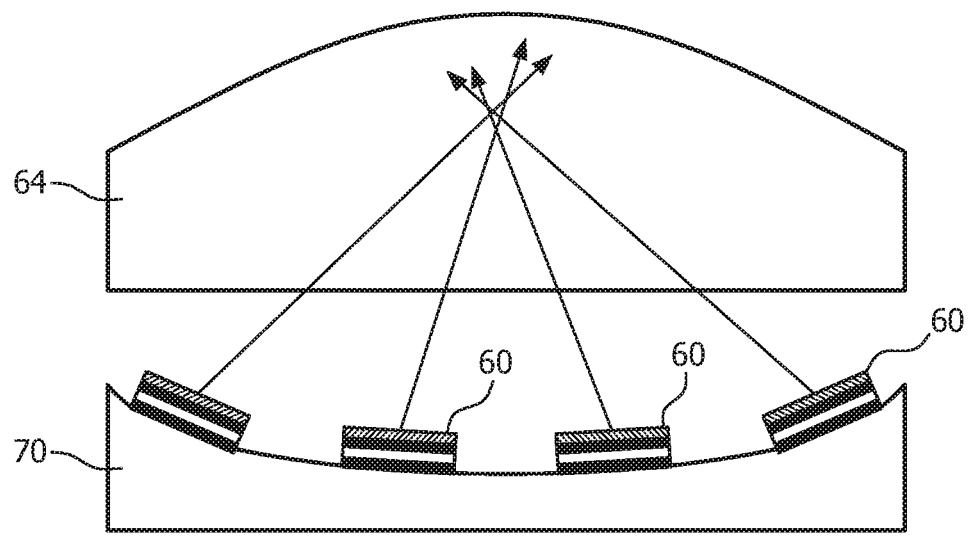
FIG. 7 shows a third example of pixel structure in accordance with the invention.

FIG. 7 shows a variation in which the tilted OLED emitters 60 are positioned across a concave contoured surface 70 positioned directly under the (convex) lenticular lens 64.

In this case an additional benefit is that all OLED pixel emitters can be brought into focus simultaneously. In particular, the pixels across the lens width direction are arranged with different heights over the substrate, so that they can be positioned closer to the focal curve/surface of the lenticular lens. Thus, the pixels are preferably positioned at heights corresponding to the focal surface of the lenticular lens. This can also be achieved in the embodiment of FIG. 6 by suitable design of the height as well as orientation provided to the pixels. In this way, all pixels below the lenticular lens are brought into focus by varying the spacing between the substrate and the tilted emitters in a repeating manner across the lenticular lenses. In the case of a top emitting structure, the spacing increases towards the edge of each lenticular lens.

Figure 8:
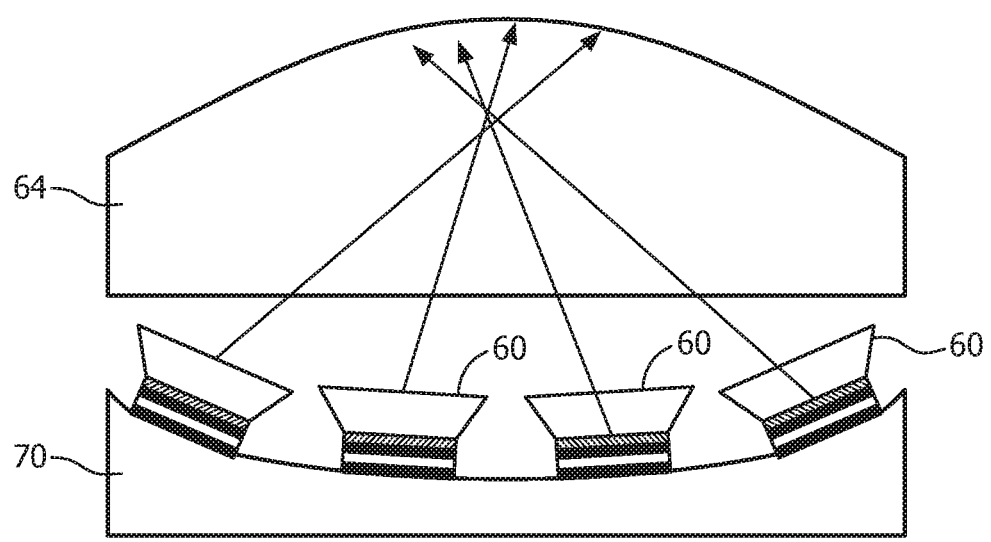
FIG. 8 shows a fourth example of pixel structure in accordance with the invention.

As mentioned above, collimating OLED emitters can be used, and FIG. 8 shows a modification to FIG. 7 to show schematically the use of collimated OLED pixels 60.

Figure 9:
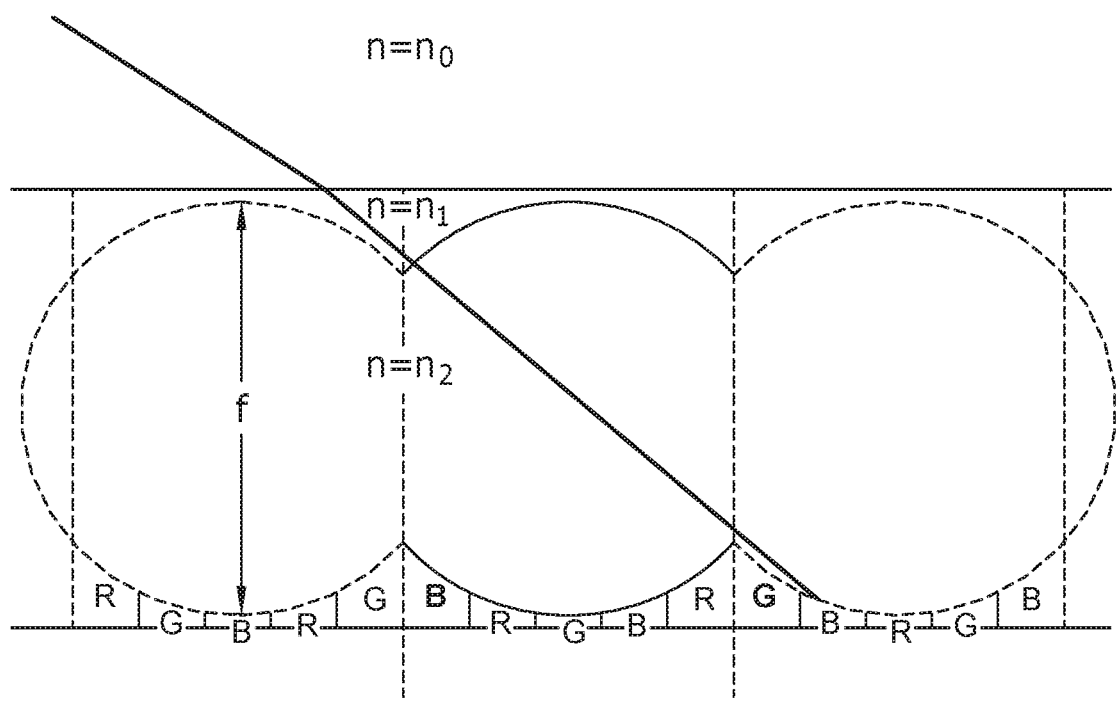
FIG. 9 is used to explain how the views in secondary cones can be affected.

The designs above are intended to provide the best viewing experience within the primary cone (explained above with reference to FIG. 2). As shown in FIG. 9, for oblique angles and therefore for lateral (secondary) viewing cones, light is emanating from a reduced set of pixels, representing a reduced set of views, and thus the parallax and thereby the 3-D effect is reduced. In FIG. 9, a light ray from the second pixel in from the edge of the lens area is shown, which is a blue (sub) pixel. The edge pixel which is shown as green will not contribute to secondary viewing cones to the left, whereas all pixels for a flat display panel will contribute to secondary viewing cones to each side. This may be well acceptable for some applications, but for single-user devices it may be better to reduce the viewing range to the primary cone.

This can be achieved by blocking unwanted rays of light for example by using blocking structures between the lenses, and it is even possible make this choice adaptive.

An alternative is to design the optics so that a full single cone solution is provided. For example, the output from a single cone can span the full 180 degrees, or else a smaller angle such as 120 degrees with no viewing beyond this single cone region. A single cone solution can for example use the techniques described in WO-2009/147588. For a single cone display the outermost views will still not have a very good quality so the optical design should be optimized on the inmost 45 degrees to 90 degrees for example.

It is noted that the curvature of the tilted emitters can be adjusted to correct for monochromatic aberrations.

Outside of a zone with proper view separation, the stereoscopic cue is lost but the motion parallax cue can be preserved. However it may be better to create a left and right 2D region if 3D information is lacking in the content. This allows the use of big emitters for the 2D regions and reduces some of the complexity of the active matrix and other display electronics.

The display can comprise any electroluminescent display technology, such as PLEDs (polymer LEDs) or OLEDs (organic LEDs).

The technology used to form the display pixels is not changed by implementing the invention. Similarly, the lenticular lens design is not altered. Instead, the tilts are used to modify the pixel layout to be suitable for the lenticular design.

As mentioned above, the tilt angle is relatively small, and also any desired height offset is a fraction of the pixel width, so that the processing is not complicated.

The display will typically comprise an active matrix display, with drive electronics associated with each display pixel, for switching a drive current to selected pixels. This can be carried out in routine manner and is not affected by the invention. For this reason, the drive electronics is not shown or described in detail. The connections to the pixel anodes and cathodes need to step up the height differences, or else vias can be used to connect to the different-height pixel terminals.

The examples shown schematically above have four or five pixels under the width of the lens. The number of pixels beneath each lens dictates the number of views as well as viewing cones of the display, and there may be more or less, for example 3, 9 or 11. In general, there are at least two pixels per lens width.

The pixel pitch is slightly larger than the lens pitch, so that the pixels effectively wrap around the lenticular screen to create the pair of views in the ideal viewing direction.

There can be at least three pixels per lens width for a multi-view system.

The lens pitch can be a non-integer multiple of the pixel pitch, and in this case the viewing cones are distributed over adjacent lenses.

The examples above make use of lenticular lenses as the view forming arrangement. However, an array of microlenses can also be used. Each microlens again covers a set of pixels in the width (i.e. row) direction and the different pixels have different tilt orientations. The microlens will in general also display a curvature in the column direction. If associated with more than one pixel in the column direction, the different pixels have different tilt orientations across the width of the lens in the column direction—whereby the view forming element essentially consists of two distinct width directions. Typically, the tilt direction of these pixels will be in a plane perpendicular to the plane of tilt of the pixels in the row direction. Furthermore, there may be pixels associated with the corners of the microlenses where the plane of tilt is intermediate between the other pixels. In the column direction, each microlens can be associated with one or more pixels. The example of a lenticular lens can be considered to be a microlens extended to the extreme of covering a full column of pixels.

The invention can be applied to 3D displays as used in TVs, tablets and phones.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An autostereoscopic display device comprising:
   a display,
      wherein the display comprises an array of electroluminescent pixels,
      wherein the array of electroluminescent pixels is disposed over a substrate,
      wherein the array of electroluminescent pixels has rows and columns,
      wherein the rows are disposed in a width direction,
      wherein the columns are disposed in a height direction,
      wherein each pixel has a light output surface; and
   an autostereoscopic view forming arrangement comprising a set of view forming elements is disposed over the display,
      wherein a portion of the array of electroluminescent pixels is provided beneath each view forming element,
      wherein at least two electroluminescent pixels are arranged across each of the view forming elements in the width direction,
      wherein the at least two electroluminescent pixels are arranged to have at least two different angular orientations of the light output surfaces with respect to the substrate,
      wherein a sealing and passivation layer is disposed between the view forming arrangement and the array of electroluminescent pixels.

2. The autostereoscopic display device as claimed in claim 1, wherein the portion of the array of electroluminescent pixels comprises at least three electroluminescent pixels across each of the view forming elements in the width direction.

3. The autostereoscopic display device as claimed in claim 1, wherein the view forming arrangement comprises an array of lenticular lenses.

4. The autostereoscopic display device as claimed in claim 3, wherein the electroluminescent pixels are positioned at heights corresponding to the focal surface of the lenticular lens.

5. The autostereoscopic display device as claimed in claim 3,
   wherein the lenticular lenses extend in the height direction or are inclined at an acute angle to the height direction,
   wherein each lens covers a plurality of columns.

6. The autostereoscopic display device as claimed in claim 1, wherein the display comprises:
   an array of reflective anodes disposed over the substrate;
   an array of electroluminescent layer portions disposed over the anodes; and
   an array of transparent cathodes disposed over the electroluminescent layer portions.

7. The autostereoscopic display device as claimed in claim 6, wherein the portion of the array of electroluminescent pixels comprises at least three electroluminescent pixels across each of the view forming elements in the width direction.

8. The autostereoscopic display device as claimed in claim 6, wherein the view forming arrangement comprises an array of lenticular lenses.

9. The autostereoscopic display device as claimed in claim 8, wherein the electroluminescent pixels are positioned at heights corresponding to the focal surface of the lenticular lens.

10. The autostereoscopic display device as claimed in claim 8,
    wherein the lenticular lenses extend in the height direction or are inclined at an acute angle to the height direction,
    wherein each lens covers a plurality of columns.

11. The autostereoscopic display device as claimed in claim 6,
    wherein the substrate is planar,
    wherein the device comprises spacers between the substrate and at a portion of the electroluminescent pixels,
    wherein the spacers define at least two different tilt angles.

12. The autostereoscopic display device as claimed in claim 6,
    wherein the substrate is planar,
    wherein the device comprises spacers between the substrate and at a portion of the electroluminescent pixels,
    wherein the spacers define at least two different pixel heights with respect to the substrate.

13. The autostereoscopic display device as claimed in claim 6,
    wherein the substrate has a non-planar shape,
    wherein the non-planer shapes defines at least two different tilt angles at a substrate surface.

14. The autostereoscopic display device as claimed in claim 1,
    wherein the substrate is planar,
    wherein the device comprises spacers between the substrate and at a portion of the electroluminescent pixels,
    wherein the spacers define at least two different tilt angles.

15. The autostereoscopic display device as claimed in claim 1,
    wherein the substrate is planar,
    wherein the device comprises spacers between the substrate and at a portion of the electroluminescent pixels,
    wherein the spacers define at least two different pixel heights with respect to the substrate.

16. The autostereoscopic display device as claimed in claim 1,
    wherein the substrate has a non-planar shape,
    wherein the non-planer shape defines at least two different tilt angles at a substrate surface.

17. The autostereoscopic display device as claimed in claim 1, wherein the display comprises:

an array of transparent anodes disposed over the substrate;

an array of electroluminescent layer portions disposed over the anodes; and and an array of reflective cathodes disposed over the electroluminescent layer portions.

18. The autostereoscopic display device as claimed in claim 17, wherein the portion of the array of electroluminescent pixels comprises at least three electroluminescent pixels across each of the view forming elements in the width direction.

19. The autostereoscopic display device as claimed in claim 17, wherein the view forming arrangement comprises an array of lenticular lenses.

20. The autostereoscopic display device as claimed in claim 19, wherein the electroluminescent pixels are positioned at heights corresponding to the focal surface of the lenticular lens.

21. The autostereoscopic display device as claimed in claim 19,
wherein the lenticular lenses extend in the height direction or are inclined at an acute angle to the height direction,
wherein each lens covers a plurality of columns.

22. The autostereoscopic display device as claimed in claim 17,
wherein the substrate is planar,
wherein the device comprises spacers between the substrate and at a portion of the electroluminescent pixels,
wherein the spacers define at least two different tilt angles.

23. The autostereoscopic display device as claimed in claim 17,
wherein the substrate is planar,
wherein the device comprises spacers between the substrate and at a portion of the electroluminescent pixels,
wherein the spacers define at least two different pixel heights with respect to the substrate.

24. The autostereoscopic display device as claimed in claim 17,
wherein the substrate has a non-planar shape,
wherein the non-planer shape defines at least two different tilt angles at a substrate surface.

* * * * *